Aug. 6, 1968  W. P. CROPPER  3,396,336
PEAK READER APPARATUS EMPLOYING A SERVO REBALANCE MOTOR
OPERATING IN A SINGLE DIRECTION
Filed Aug. 12, 1964  2 Sheets-Sheet 2
Fig. 2
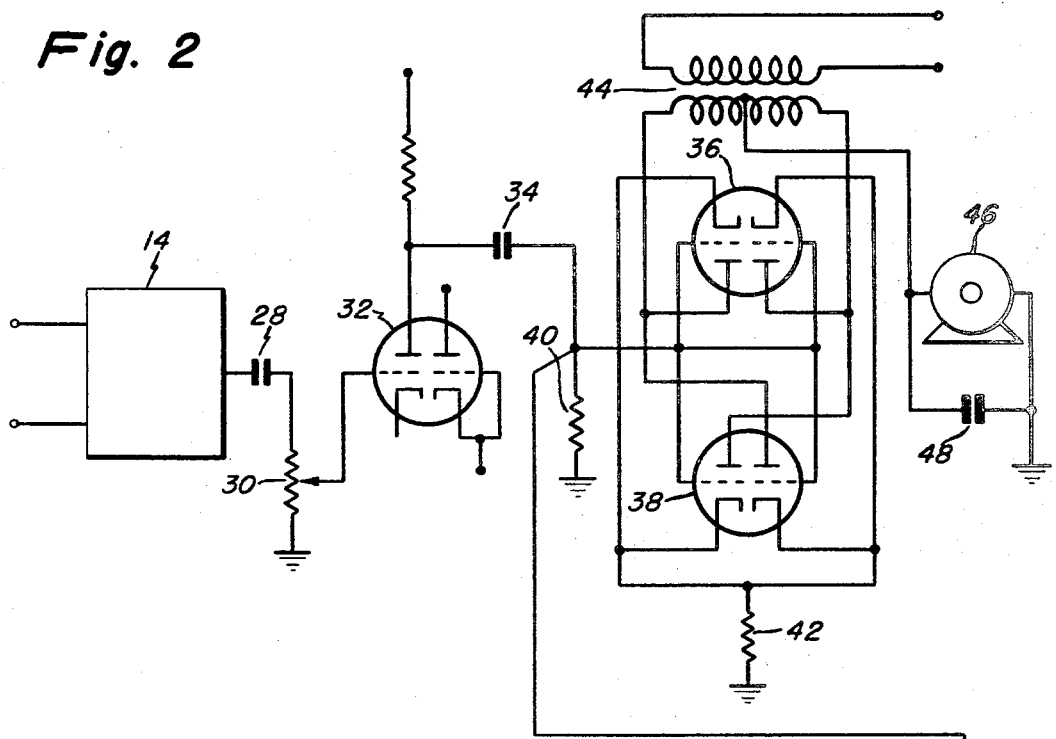
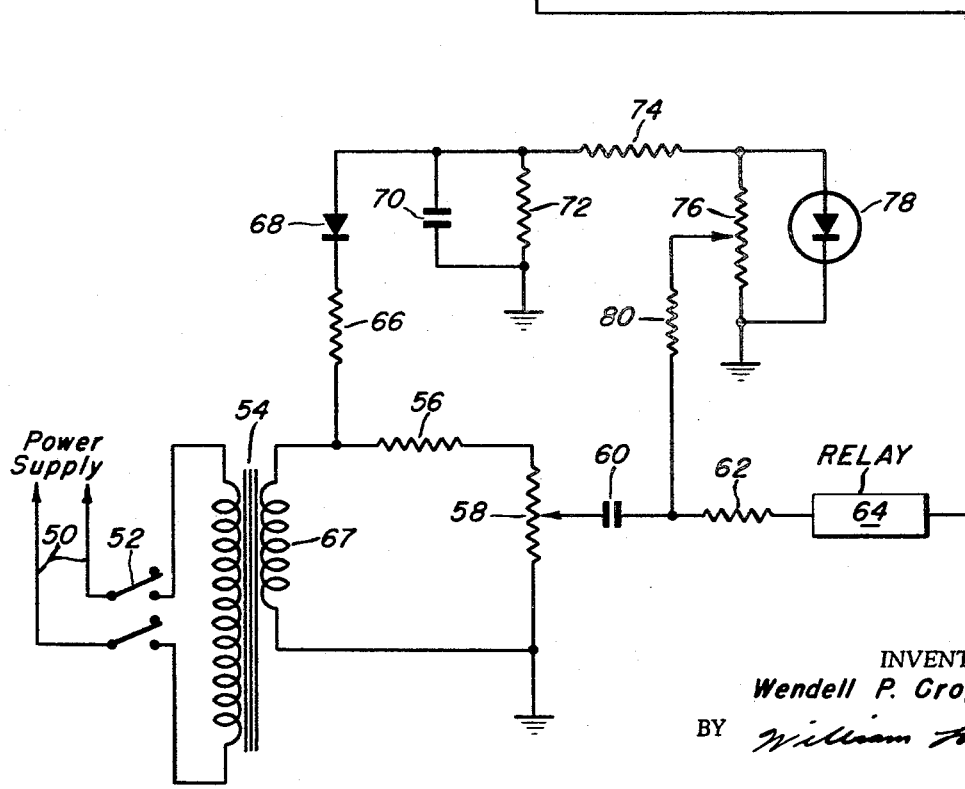
INVENTOR.
Wendell P. Cropper
BY William Toff
ATTORNEY

United States Patent Office 3,396,336
Patented Aug. 6, 1968

3,396,336
PEAK READER APPARATUS EMPLOYING A SERVO REBALANCE MOTOR OPERATING IN A SINGLE DIRECTION
Wendell P. Cropper, Lansing, Ill., assignor to Standard Oil Company, Chicago, Ill., a corporation of Indiana
Filed Aug. 12, 1964, Ser. No. 389,019
6 Claims. (Cl. 324—103)

ABSTRACT OF THE DISCLOSURE

A peak reader and memory apparatus including a signal source, a measuring circuit, and input and voltage amplifier, a power amplifier, and an error signal cancellation voltage connected in series, and a servomotor connected to the power amplifier. A linkage from the servomotor is connected to the measuring circuit. The measuring circuit is also connected to a retransmitting slide wire.

---

This invention relates to a peak reader and memory apparatus adapted for use with a sensing element as a computer input and more particularly to an apparatus which utilizes the elements of a null-balance electrical measuring system plus a means for cancelling one of the two possible AC error phase signals either leading or lagging that can be transmitted in the measuring system. The remaining signal actuates the measuring element of the measuring system in only one direction and therefore produces an output corresponding to the maximum peak value of the sensing element. This peak value is retained for a time until is can be fed in to a computer. Thus the apparatus provides both peak reading and memory facilities.

Many instruments, such as acid analyzers using conductometric techniques and chromatographic analyzers, produce records in which the peak values are the meaningful data. Several utilize a null-balance electrical measuring system with a potentiometer or Wheatstone bridge, because of the accuracies of the system. It is desirable to use such instruments as data sources for computers.

It is therefore an object of this invention to provide a peak reader and memory apparatus adapted for use as a computer input. Another object is to provide an apparatus with such features, which apparatus utilizes the elements of a null-balance electrical measuring system. Other objects will become apparent from the detailed description below.

I have found that a peak reader and memory apparatus, usable as a computer input, can be made from a null-balance electrical measuring system and a means for cancelling one of the two AC error signals being transmitted in the system. The null-balance electrical measuring system includes an AC error signal means which produces first and second AC error signals with a 180° phase difference from changes in the output of a sensing element, means for amplifying the AC error signals, servomotor means being driven in first and second directions by the first and second AC error signals, respectively, for reducing the error signals to essentially zero, and measuring means being driven by the servomotor means to a position indicating the magnitude of the output from the sensing element. I have provided means connected to the amplifying means for feeding into such means an AC voltage of opposite phase to one of the two error signals and a negative DC voltage to essentially cancel that error signal and to permit the resultant apparatus to produce an output corresponding to the peak output from the sensing element. The resultant apparatus is convenient to use, easily modified to the usual null-balance operation with both error signals, of low cost, and reliable.

Briefly, my invention is directed to a peak reader and memory apparatus utilizing the elements of a null-balance electrical measuring system and a means for cancelling one of the two AC error signals being transmitted by the system.

A fuller understanding of the present invention by means of other objects, advantages and aspects of the above described will be apparent to those skilled in the art in a more detailed description taken in conjunction with the appended drawing, in which:

FIGURE 2 is a circuit diagram illustrating a circuit for the error signal cancellation voltage and the power amplifier.

Figure 1:
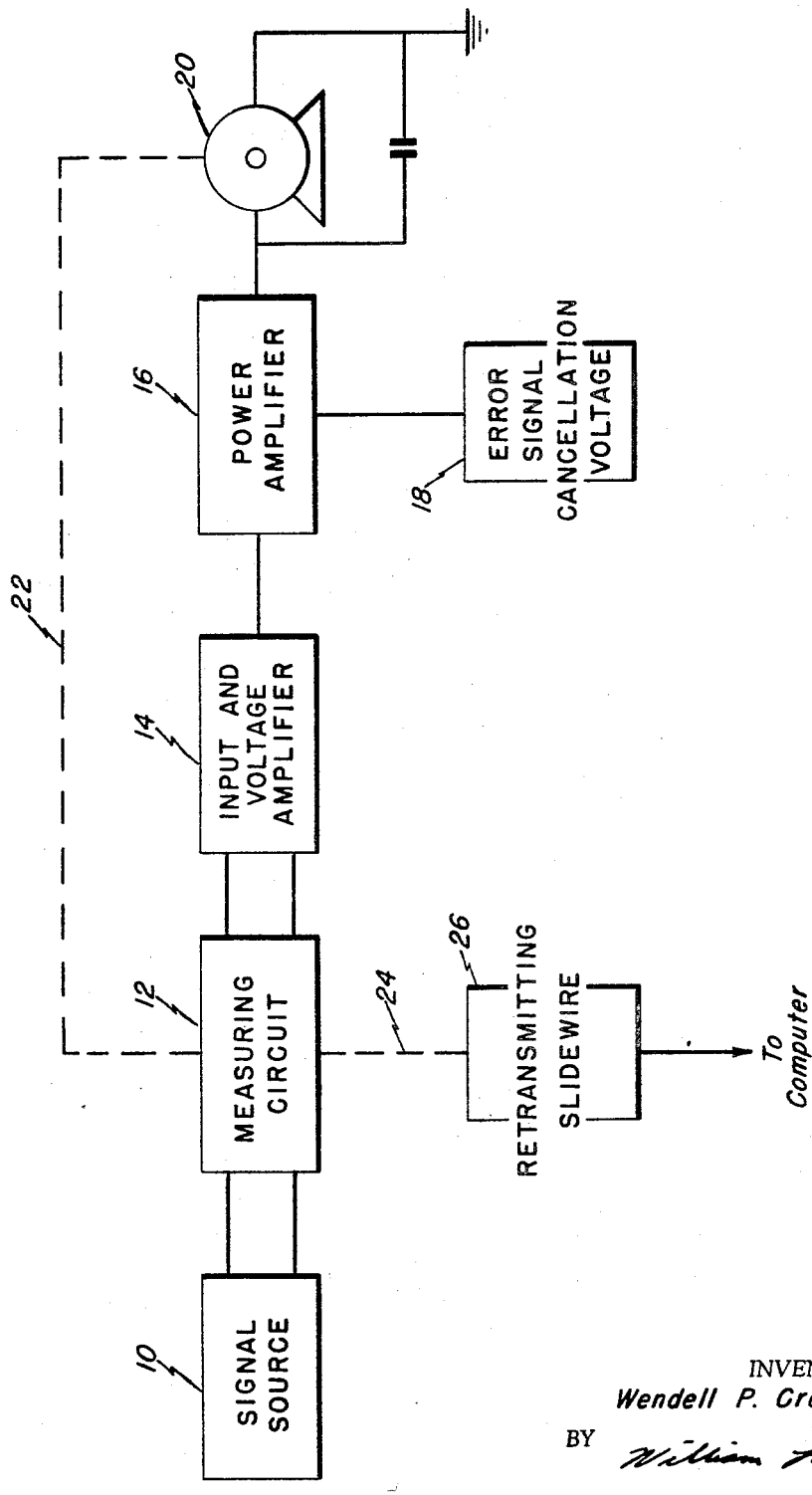
FIGURE 1 is a block diagram of an instrument system using the elements of the peak reader and memory apparatus.

Turning first to FIGURE 1, signal source 10 generates a signal which is fed to measuring circuit 12. The signal source may be a conductometric cell in an acid analyzer or a similar transducer for converting a physical signal to an electrical signal. Measuring circuit 12 may include a Wheatstone bridge in which the conductometric cell serves as part of the bridge, or it may be potentiometric. Depending on the circuit used, power may be supplied from an AC or Dc source (not shown). As is usual in these measuring circuits, the signal from signal source 10 is balanced against a datum point in the measuring circuit. An increase or decrease in the output of signal source 10 therefore generates an error signal in the measuring circuit 12.

This error signal is transmitted into input and voltage amplifier stages 14. If the signal from measuring circuit 12 is AC, the signal is fed directly into amplifier 14. If the error signal is DC, a chopper is utilized in connection with input voltage amplifier 14.

It will be understood that the AC error signal developed in the described circuit will have a phase dependent on the direction of the change in the output from signal source 10. The phase difference between the two AC error signals developed in the circuit will be 180°.

The signal is fed from 14 to power amplifier 16. Also connected to power amplifier 16, conveniently just before the power output section, is error signal cancellation voltage 18 which supplies an AC voltage of opposite phase to error signals of a given phase being amplified in the power amplifier 16 and a negative DC voltage. The AC voltage from 18 is used to cancel that error signal in power amplifier 16 and the DC voltage insures the completeness of such cancellation. The output from power amplifier 16 therefore represents only the non-cancelled AC error signal.

The output of power amplifier 16 is used to drive servomotor 20 in the direction to remove the unbalance in measuring circuit 12 caused by the change of the output of signal source 10. Servomotor 20 is connected by way of linkage 22 to measuring circuit 12. For illustration, when measuring circuit 12 includes the Wheatstone bridge, linkage 22 is connected to the balancing resistor in the Wheatstone bridge circuit to move the slider to a point at which the bridge is balanced. Linkage 22 is also connected by way of linkage 24 to retransmitting slide wire 26.

The position of the slide wire in 26 corresponds to the value of the output of signal source 10. A voltage across the slide wire of 26 serves as a signal source which can be transmitted to a computer (not shown).

In the above discussion concerning power amplifier 16 and error signal cancellation voltage 18, it is pointed out that one of the AC error signals is cancelled and only the remaining signal is transmitted as output from power amplifier 16. Because the phase of this signal fixes the direction in which servomotor 20 drives linkages 22 and 24, the position of retransmitting slide wire 26 will eventually represent the peak output from signal source 10. If the output from signal source 10 subsequently decreases, the resulting AC error signal will be cancelled in power amplifier 16 and servomotor 20 therefore will not be actuated. This permits retransmitting slide wire 26 to remain at its peak position for a time until the value can be fed into the computer.

The operation of the peak picker can be described as follows: Depending on the state of the measuring circuit 12 with respect to the input signal from the input signal source 10 the AC error signal applied to terminal 40 (FIGURE 2) will be of a first phase with respect to a reference or of a second phase 180 degrees displaced from the first phase. The power amplifier including tubes 36 and 38 produces an output sufficiently large to drive servomotor 46 only if the input voltage at terminal 40 is sufficiently large to exceed a minimum threshold. A second AC signal developed at the output of relay 64 of the same phase as the first phase is also applied at terminal 40. The second AC signal is of a magnitude just below the minimum threshold necessary to drive servomotor 46. Assume now, that a positive input signal is applied by device 10 of sufficient magnitude to produce an error signal of the first phase. With such an input, signals of the first phase are added to the second AC signal since they are of the same phase to drive the servomotor in a first direction. If an error signal of the second phase is applied to terminal 40 the second AC signal is subtracted from it since the two signals are of opposite phase. The error signal of the second phase minus the second AC signal never reach the minimum threshold to drive the servomotor in a second direction. Consequently in the mode of operation, above set forth, the servomotor will respond only to positive input signals.

Unless the cancelling DC voltage is provided by 18, the cancellation of the AC error signal is usually not perfect because the amplifier signal is not a pure 60-cycle sine wave. The net effect is an increase in the positive grid bias of the output tube grids. This can cause a "memorized" slide wire position to drift, particularly when relatively large error signals of the type which will be cancelled are impressed on the input of the amplifier. To compensate for this effect and thereby eliminate drift problems, the cancelling DC voltage is required. The cancelling AC and DC voltages are commonly in the order of 10–20 and 10–35 volts.

In FIGURE 2, input and voltage amplifier 14 is represented by a block diagram. Power amplifier 16 is represented by a three-tube circuit and error signal cancellation voltage 18 is represented by the remaining circuit. The operation of the circuits in power amplifier 16 and error signal cancellation voltage 18 are as described above. Error signals from input in amplifier 14 are fed via capacitor 28 to variable resistor 30 which serves as a voltage control. The signal from resistor 30 is fed to tube 32 and the output from this tube is fed via capacitor 34 to output tubes 36 and 38. Resistor 40 serves as the input grid resistor for the output tubes 36 and 38. Transformer 44 serves as a power source for driving servomotor 46. The direction of the movement in the servomotor 46 depends on the phase of the error signal being fed into power output tubes 36 and 38.

Power supply 50 supplies AC power through switch 52 to transformer 54 which illustratively has a 125 volt secondary. Resistor 56 and variable resistor 58 serve as an AC voltage supply for cancelling one of the error signals in power amplifier 16. The cancelling AC voltage is fed via capacitor 60 and resistor 62 to relay 64 and then to grids of power tubes 36 and 38. Relay 64 serves as a switch means to permit connecting or disconnecting the cancelling voltages from the power amplifier 16 thereby permitting the previously cancelled AC error signal to again actuate servomotor 46 in a direction to return retransmitting slide wire 26 (in FIGURE 1) to a position below its peak position prior to the start of another test. Resistor 66 is connected to the secondary 67 of transformer 54. Direct-current voltages are obtained from rectifier 68 and the filter-bleeder combination of capacitor 70 and resistor 72. Resistor 66 also protects rectifier 68 against excessive currents.

The DC voltage at the output of the filter network is applied to the series combination of resistors 74 and 76. Zener diode 78 stabilizes the voltage across resistor 76 at the desired value, suitably approximately 100 volts. The DC voltage at the slider of resistor 76 is connected by way of resistor 80 and combined with the AC voltage from capacitor 60. The voltages passing through resistor 62 are thus combined AC and DC voltages. Thus the circuit represents a single AC source for the cancelling voltages with a portion providing the cancelling AC voltage and a portion serving as a rectifying means providing the cancelling DC voltage.

In many instances the cancelled AC error signal is that which would ordinarily produce downscale movement of the retransmitting slide wire 26. However, in some instances, such as pour-point instruments, the minimum position of slide wire 26 would be the desired value; and, in this case the other AC error signal would be the cancelled signal. This is accomplished by a simple modification of the circuit in 18 so that the phase of the AC voltage is reversed.

The above description illustrates that I have provided a peak reader and memory apparatus which has the advantages of being easily made from conventional null-balance electrical measuring systems and is low cost yet reliable in operation. Since the operation of the null-balance electrical measuring system is modified by the operation of the error signal cancellation voltage 18, I have provided, when desired, relay 64 which serves to connect or disconnect cancelling voltage 18 from power amplifier 16. In this way, the peak reader and memory functions may be temporarily disconnected and the normal operation of the null-balance measuring system can be carried out.

In FIGURE 2, the components in the amplifying section are those found in Brown amplifiers. In the remaining circuit, the values of resistors, capacitors, rectifier, diode, and relay which were actually employed for the above test according to the foregoing principles are set forth below.

Resistors:
    56 _____ 10K.
    58 _____ 100K.
    62 _____ 300K.
    66 _____ 47.
    72 _____ 33K.
    74 _____ 39K.
    76 _____ 100K.
    80 _____ 100K.
Capacitors:
    60 _____ 0.1 mfd.
    70 _____ 20 mfd.
Rectifier 68 _____ IN91.
Diode 78 _____ ¼M 100Z.
Relay 64 _____ Magnecraft W88AHPX–7.

A test was carried out in which the peak reader and memory apparatus was used to drive a recording pen. The pen was first driven upscale, and then, downscale signals of increasing magnitude were applied. The apparatus provided cancellation of the downscale signals. No drift, either upscale or downscale, was observed during the 56-hour test.

Obviously, many alternatives, modifications, and variations will be apparent to those skilled in the art in view of the foregoing description. However, application of cancelling voltages in the voltage amplifier stages has been found less effective than application of such voltages in the power amplifier stages. Thus the cancelling AC and DC voltages may be connected to other points than the grids of power-output tubes 36 and 38 since the AC error signals are being transmitted through a number of amplifier stages. Also, transistor components can be substituted for the vacuum tubes shown. It is intended that these alternatives, modifications, and variations as fall within the spirit and broad scope of the invention, as well as to embrace all other uses for the inventive apparatus, fall within the scope of the appended claims.

I claim:

1. A peak reader and memory apparatus adapted for use with a sensing element as a computer input comprising an AC error signal means which produces first and second AC error signals from the output of said sensing element, said error signals having a phase difference of 180°, means connected to said error signal means for amplifying said signals, servomotor means connected to said amplifying means and being driven in first and second directions by said first and second error signals, respectively, for reducing the error signal to essentially zero, measuring means driven by said servomotor means in a direction and to a position indicating the magnitude of the output from the sensing element; means for generating an AC voltage of opposite phase to that of one of said error signals and a negative DC voltage, and means to apply the output of the means for generating to the amplifying means to essentially cancel said one of said error signals and to permit said measuring means to remain at its peak value for a time in which said value can be fed into said computer.

2. The peak reader and memory apparatus of claim 1 wherein said cancelling AC and DC voltages are fed into said amplifying means just before the power output section.

3. The peak reader and memory apparatus of claim 1 wherein said AC and DC voltage generating means includes a single AC source, a portion of which provides said cancelling AC voltage signal, and a portion of which is a rectifying means providing said cancelling DC voltage.

4. The peak reader and memory apparatus of claim 1 wherein a switch means is connected between said AC and DC voltage generating means and said amplifying means to permit disconnecting said voltage means from said amplifying means to return said measuring means to a position below its peak position.

5. The peak reader and memory apparatus of claim 2 wherein said cancelling AC and DC voltages are fed into said amplifying means at the grid inputs of the power output.

6. The peak reader and memory apparatus of claim 2 wherein said AC and DC voltage generating means includes a single AC source, a portion of which provides said cancelling AC voltage, and a portion of which is rectified to provide said cancelling DC voltage, and wherein a switch means is connected between said AC and DC voltage means and said amplifying means to permit disconnecting said signal means from said amplifying means and return said measuring means to a position below its peak position.

References Cited

UNITED STATES PATENTS

| 2,944,201 | 7/1960 | Doolen | 324—99 X |
| 3,008,076 | 11/1961 | MacDonald | 318—28 |
| 3,176,205 | 3/1965 | Peters | 318—28 |
| 3,302,112 | 1/1967 | Hyer | 324—99 |

RUDOLPH V. ROLINEC, *Primary Examiner.*

E. F. KARLSEN *Assistant Examiner.*